Oct. 4, 1955  W. K. MAENPAA ET AL  2,719,912
TRAIN SPEED CONTROL SYSTEM
Filed May 24, 1952  2 Sheets-Sheet 1
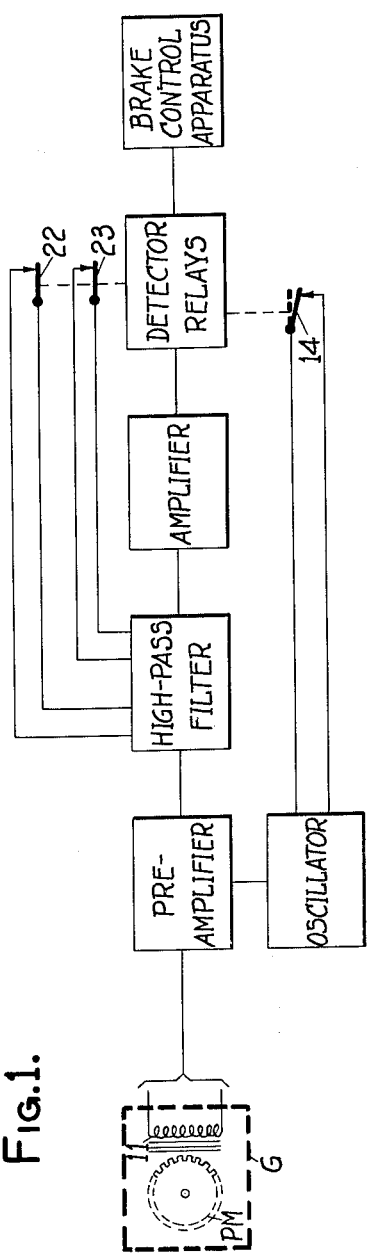
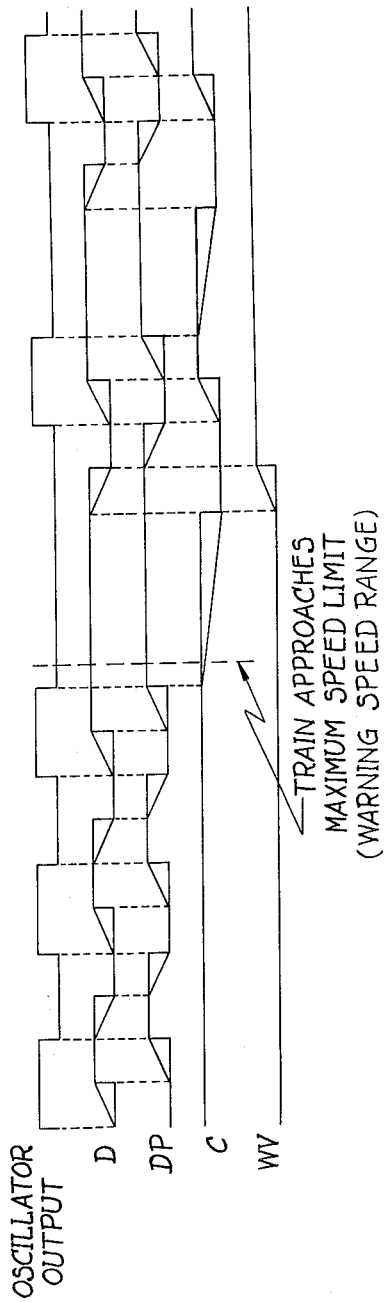
INVENTORS
W. K. Maenpaa and J. D. Hughson
BY
Neil D. Preston
Their ATTORNEY

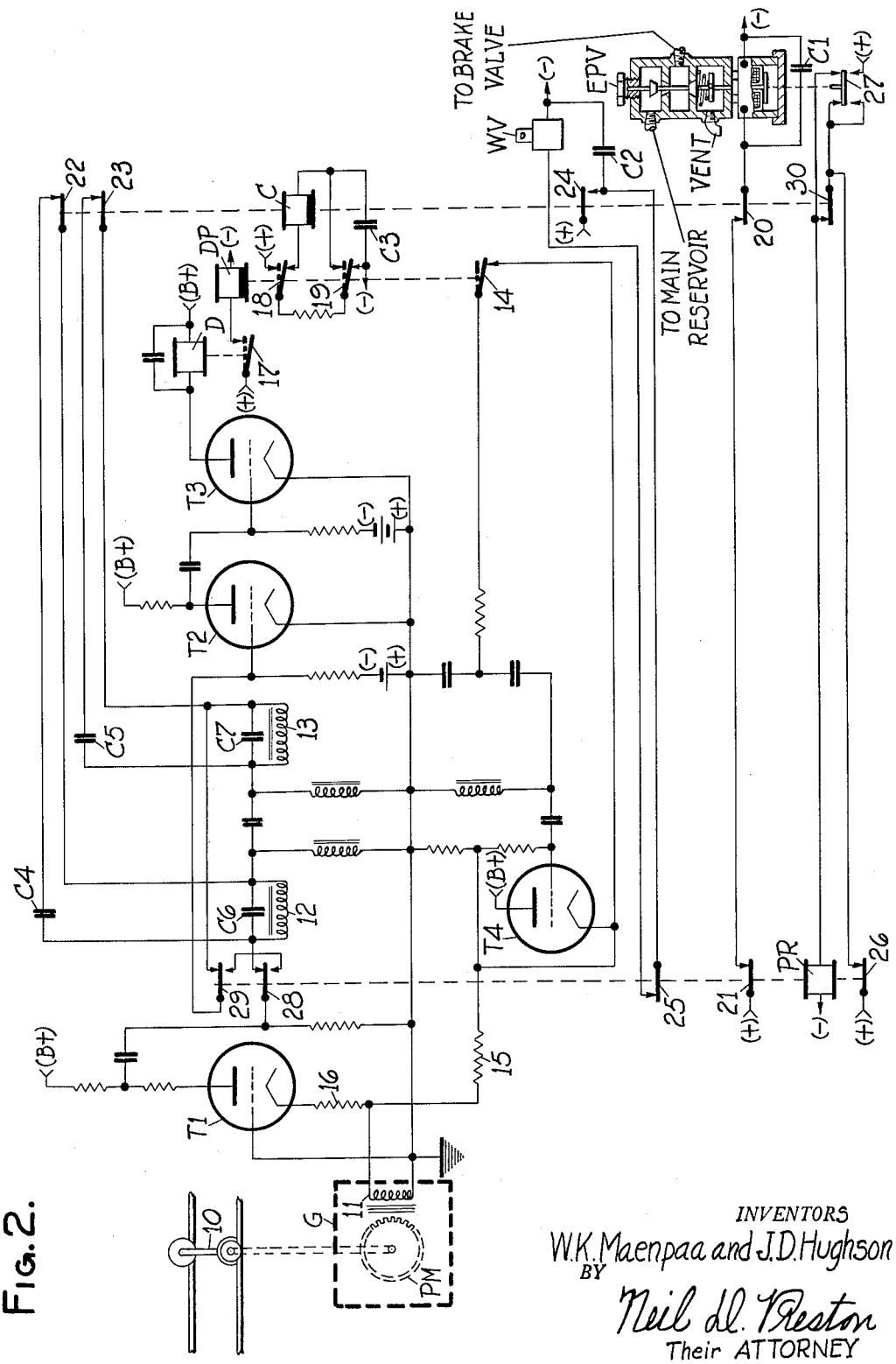

United States Patent Office

2,719,912
Patented Oct. 4, 1955

2,719,912

TRAIN SPEED CONTROL SYSTEM

Wilho K. Maenpaa and J. Donald Hughson, Rochester, N. Y., assignors to General Railway Signal Company, Rochester, N. Y.

Application May 24, 1952, Serial No. 289,762

8 Claims. (Cl. 246—182)

This invention relates to train speed control systems for railroads, and it more particularly pertains to frequency responsive speed governing means for a train.

Where over speed control is proved in a manner to automatically make a service application of the brakes when a train reaches a certain speed limit, it is desirable to provide an interval when maximum speed is being approached wherein a warning indication is given.

Generally speaking, the present invention contemplates the driving of a frequency generator by a locomotive axle, and the application of the output of the generator to the control of a detector relay through suitable amplifier and filter stages, whereby the detector relay is distinctively controlled when a particular frequency corresponding to maximum speed is reached. The determination of this maximum speed is when the frequency of the generator exceeds the lower end of the pass-band of a high pass filter.

According to the present invention, the start of the pass-band of the high pass filter is intermittently varied by the selective control of filter condensers when the frequency generated is indicative of the train approaching its speed limit. In this way, the output of the frequency generator as intermittently applied through the filter sets up a distinctive control for a warning indication indicative that maximum speed is being approached. If the speed continues to increase, the intermittent operation ceases and a service application of the brakes is made automatically.

An object of the present invention is to provide a warning of approach to an over speed condition in a frequency governor type of speed control system.

Another object of the present invention is to provide a warning of an approach to an over speed condition by an intermittent operation involving intermittently changing the starting frequency of the pass band of a high pass filter.

Another object of the present invention is to intermittently check the integrity of an over speed control system of the character described.

Other objects, purposes, and characteristic features of the present invention will be in part obvious from the accompanying drawings, and in part pointed out as the description of the invention progresses.

In describing the invention in detail, reference is made to the accompanying drawings in which corresponding parts are identified by similar reference characters; and in which:

Fig. 1 is a block diagram illustrating the general organization of the train speed control system according to the present invention;

Fig. 2 illustrates the organization of a specific embodiment of the train speed control system provided by the present invention;

Fig. 3 is a sequence diagram illustrating the sequence of operations involved under certain assumed operating conditions of the system.

The illustrations employed in the disclosure of the present invention have been arranged to facilitate the disclosure as to the mode of operation and principles involved, rather than for the purpose of illustrating the actual construction and arrangement of parts that would be employed in practice. Thus the various parts are illustrated by conventional symbols, the symbols (+) and (—) being employed to indicate connections to the respective positive and negative terminals of suitable batteries or other sources of direct current, and the symbols (B+) and (ground) being used to designate connections to a suitable high voltage direct current "B" supply for electronic circuits.

With reference to Figs. 1 and 2, an axle 10 of a locomotive is illustrated as having connected thereto a frequency generator G having a toothed permanent magnet rotor PM which is driven directly by the rotation of the axle 10 of a locomotive. The rotation of the rotor PM of the generator G sets up an alternating current in the winding 11 at a frequency proportional to the speed of the locomotive. It is to be understood, however, that other types of frequency generators could as well be used.

With reference to the block diagram of Fig. 1, the system comprises a frequency generator, a pre-amplifier, a high-pass filter, an amplifier, detector relays, brake control apparatus, and an oscillator.

The control of the brakes of the locomotive is accomplished by the selective energization or deenergization of a conventional electro-pneumatic valve EPV (see Fig. 2), the structure of which is well known to those familiar with the art, and may be provided as is specifically disclosed, for example, in the patent to C. S. Bushnell, No. 1,855,596, dated April 26, 1932. The electro-pneumatic valve EPV is normally energized to permit the brakes of the train to be released, and is effective when deenergized to reduce the air pressure and thereby cause a service application of the brakes of the train. According to the present invention, the valve EPV is made slow acting by reason of the winding of the valve being shunted by a condenser C1; but it is to be understood that other expedients may be employed for rendering the valve slow in operating.

An audible indication device WV is provided for the purpose of furnishing a warning indication, the exact nature of the indication device WV being a matter of choice in accordance with the requirements of practice. This may be considered as a whistle and whistle valve combination, or as any other suitable type of indication device.

A control relay C is provided for governing the whistle valve WV and the electro-pneumatic valve EPV, this relay having slow acting characteristics so as to be normally maintained steadily picked up in accordance with the intermittent energization of its windings by the discharge of a condenser C3.

Detector relays D and DP are provided for selectively governing the charging of the condenser C3, the relays D and DP being slow acting for purposes to be more readily understood as the description of the invention progresses.

A penalty relay PR is provided as a means for requiring a substantial reduction in the speed of a train subsequent to the train having exceeded its speed limit and the service application of the brakes having been made.

The pre-amplifier comprises a tube T1 that is normally conducting and is operated preferably as a class A amplifier.

Although different types of high-pass filters may be used, the filter employed according to Fig. 2 is a high-pass filter having tuned end sections 12 and 13 for the purpose of obtaining a high degree of selectivity at the lower limit of the pass-band. Supplementing the tuned end sections are suitable trimmer condensers C4 and C5, the condensers C4 and C5 being associated with the respective tuned end sections 12 and 13.

Although different frequencies relative to the speed of the locomotive axle 10 may be employed as produced by the generator G, it has been found, for one embodiment of the present invention, that a suitable range of frequencies is provided where the frequency of the generator G varies 20 cycles per second for every one mile per hour change in the speed of the locomotive. Thus at six miles per hour, the frequency of the generator G would be 120 cycles per second, and at sixty miles per hour, the frequency generated would be 1200 cycles per second. Upon determining what the speed limitation of the locomotive should be, the high-pass filter is selected as having its pass band start at a frequency substantially comparable to the frequency output of the generator G at the predetermined speed limit.

Amplifier stages having tubes T2 and T3 are provided for amplifying the output of the high pass filter sufficiently for the operation of the detector relay D.

The oscillator including tube T4, is of the L–C tuned type, but it is to be understood that other types of oscillators could be used. The frequency generated by the oscillator is high enough to be passed by the high-pass filter.

Having thus considered the general organization of the apparatus according to the present invention, consideration will hereinafter be given as to the specific circuit organizations when considering the mode of operation of the system under certain typical operating conditions.

*Operation*

Under normal conditions, when power is applied to the system, and the locomotive is standing, or is in motion but substantially below its restricted speed limit, the amplifier tubes T1 and T2 are normally conducting, and operating preferably substantially as class A amplifiers, and the input to tube T1 is fed by the output of the tube T4 of the oscillator. The tube T3 is biased substantially to cut off, and is rendered conductive for the energization of the detector relay D in response to modulation when applied to its grid by the output of the amplifier tube T2. Under the assumed normal conditions, the frequency generated by the generator G is not high enough to be passed by the high-pass filter, and thus only the frequency of the oscillator, which has been described as being above that of the high-pass filter, is effective to govern the energization of the detector relay D.

The output of the oscillator is provided only in accordance with the closure of the back contact 14 of relay DP, and thus the oscillator output is intermittently cut off upon the intermittent picking up of the slow acting relay DP according to the time-sequence charts of Fig. 3. The sequence of operation is such that the relay D (see Fig. 2) is first picked up in response to the oscillator tube T4 output being applied to the tube T1 through resistor 15; and the picking up of the relay D, by the closure of its front contact 17, causes the picking up of the relay DP. Relay DP in picking up opens back contact 14 to cut off the oscillator causing relay D to be dropped away. In dropping away, relay D opens the circuit for the repeater relay DP at front contact 17 so as to allow relay DP to be dropped away after a short time interval determined by its slow release characteristics, thereby closing back contact 14 to again apply the oscillator frequency to the cathode of tube T1. In this way the system normally maintains a cycling operation wherein the relays D and DP are intermittently operated at regular intervals.

The pumping of the contacts 18 and 19 of relay DP alternately charges the condenser C3 and discharges it through the winding of the slow acting relay C so that relay C is maintained steadily picked up to apply energy to the valve EPV through front contact 20, provided that the penalty relay PR is picked up to close front contact 21. Thus relay C is intermittently energized by the discharge of condenser C3 at a rate sufficient to maintain the relay C picked up as long as the locomotive is standing, or is in operation below its restricted speed limit, and accordingly the valve EPV is maintained steadily energized.

Because of the oscillator frequency being required to be fed through the respective pre-amplifier stages, the integrity is checked intermittently of the circuit organization for the energization of the detector relay D.

The integrity of the circuit connecting the generator G to the tube T1 is checked by reason of the pre-amplifier stage including tube T1 being a grounded grid amplifier wherein the cathode circuit extends to the generator, through the winding 11 and is returned to ground. By this circuit it is a requisite for the normal conduction of the tube T1 that the circuit connecting the winding 11 of the generator G be intact. If winding 11 should be short circuited, the output of the oscillator would be grounded so there would be no alternating current input to the tube T1.

In accordance with the relay C being normally energized, the front contacts 22 and 23 of this relay normally connect the respective condensers C4 and C5 in multiple with the condensers C6 and C7 of the respective tuned end sections 12 and 13 of the high-pass filter. The lower end of the pass band of the high-pass filter, therefore, under the conditions that have been described as normal is set at a frequency comparable to the frequency generated by the axle driven generator G when the locomotive is proceeding just below a predetermined restricted speed limit.

In accordance with this organization, when the frequency generated becomes high enough to be passed by the high-pass filter, the system enters a warning interval wherein the detector relay D and its repeater DP are held up for a longer interval of time as is indicated in Fig. 3. In fact these relays are held up until relay C becomes dropped away. Upon the dropping away of relay C, the opening of front contacts 22 and 23 disconnects the condensers C4 and C5 from the respective tuned end sections 12 and 13, and thus raises the start frequency of the pass band of the high-pass filter sufficiently to block the frequency applied by the generator G so as to permit the detector relay D and its repeater relay DP to become dropped away. Upon the dropping away of this relay, the condenser C3 becomes discharged through the winding of the relay C to pick up the relay C and again connect the condensers C4 and C5 across the end sections 12 and 13 of the high-pass filter. This reduces the frequency at which the pass band of the high-pass filter starts sufficiently to again permit the frequency of the generator G to pass through the filter and hold the detector relay D for a longer interval than normal to repeat another cycle of operation as has been heretofore described.

In this way the relay C is pulsed intermittently but at a slower rate than the normal pulsing of the relays D and DP to set up a distinctive control condition when the speed of the train approaches the predetermined restricted speed limit. The pulsing of the relay C opens the circuit for the valve EPV intermittently at front contact 20, but the valve EPV is prevented from being actuated by slow acting characteristics in accordance with the shunting of its winding by the condenser C1.

The pulsing of back contact 24 of relay C intermittently charges the condenser C2 and discharges it across the winding of the whistle valve WV through front contact 25 of the penalty relay PR so that the whistle valve WV is actuated and provides an audible indication (and/or a visual indication as desired) to call the attention of the engineer to the condition that the train is approaching maximum speed in accordance with predetermined restrictions so that he will exercise care in not permitting the speed limit to be exceeded.

It will be noted that there is no penalty for proceeding within the warning speed range except that the whistle continues to sound. If the engineer reduces his speed to a point where the frequency of the generator G is not greater than the start frequency of the pass band of the high-pass filter, with the condensers C4 and C5 included, the faster intermittent operation of the relays D and DP becomes effective as has been described when considering the normal conditions of operation, and the relay C becomes intermittently energized from the condenser C3 frequently enough to maintain it steadily picked up. When the relay C ceases to pulse, the whistle valve WV can no longer be energized from the condenser C2, and the charging circuit for the condenser C2 is maintained steadily open at back contact 24.

If, on the other hand, the predetermined restricted speed limit should be exceeded, in spite of the warning, the frequency of the generator G will be above the frequency of the high-pass filter, irrespective of the circuits including the condensers C4 and C5 being opened, and thus the detector relay D and its repeater relay DP will be steadily picked up so that there can be no further energization of the relay C. Under these conditions, the valve EPV becomes actuated to apply the brakes of the train because of its circuit being maintained steadily open at front contact 20 of relay C.

The penalty relay PR is normally maintained picked up by a stick circuit that is directly dependent upon the valve EPV. This stick circuit extends from (+) including front contact 26 of relay PR, contact 27 of valve EPV, and winding of relay PR, to (−). By the energization of this circuit, the relay PR is maintained steadily picked up until the actuation of the valve EPV to apply the brakes of the train.

When the brakes of the train are automatically applied, the dropping away of the penalty relay PR closes a shunt around the high-pass filter through back contacts 28 and 29 (the shifting of these contacts being effective to disconnect the high-pass filter from the circuit), so that the relays D and DP are steadily maintained picked up, irrespective of the generated frequency, as long as there is sufficient output voltage of the generator G for the energization of relay D through the pre-amplifier and amplifier stages. It is therefore provided that when a train exceeds its speed limit so as to cause the brakes to be automatically applied, the brakes cannot be released until the speed of the train is reduced to a predetermined speed, at which the output of the generator G is insufficient to hold the detector relay D in its picked up position. Although the design of the generator G can be such as to cause this to take place at practically any desired speed, it is most generally desirable that the speed at which re-set of the penalty relay PR can be made be approximately six miles per hour.

It is therefore provided that when the speed of the train is reduced to six miles per hour after an automatic brake application, the detector relay D and its repeater relay DP become dropped away, and the relay C becomes picked up by the discharge through its windings of the condenser C3. Upon the picking up of the relay C, under these conditions, a pickup circuit is closed for the penalty relay PR through contact 27 of the valve EPV in its actuated position, and front contact 30 of relay C. When the relay PR becomes picked up, the closure of its front contact 21 provides an energizing circuit for the valve EPV, which permits the release of the brakes of the train. The stick circuit for relay PR extending through its front contact 26 and front contact 30 of relay C maintains relay PR steadily energized during the cross-over time of the contact 27 of the valve EPV in the establishment of a stick circuit that has been described whereby the relay PR is maintained picked up until the next automatic application of the brakes. Upon the picking up of the relay PR, the shifting of the contacts 28 and 29 removes the shunt that has been described as having been applied around the high-pass filter and re-connects the high-pass filter in the circuit so that the conditions are restored to what has been described as the normal conditions of the system.

It will be noted that with the penalty relay PR dropped away, the opening of front contact 25 in the circuit for the whistle valve WV causes a cessation in the sounding of the whistle, and by the time that the penalty relay PR has again been picked up to re-close front contact 25, the relay C has first been picked up and maintained steadily energized so that there is no intermittent charging of the condenser C2 through back contact 24 of relay C. Therefore the whistle valve WV is so controlled as to be responsive only to the pulsing of the relay C, which condition takes place as has been described only when the speed of the train is approaching its restricted speed limit.

Having thus described a specific over-speed control system as one embodiment of the present invention, it is desired to be understood that this form of the invention has been described more particularly for the purpose of illustrating the mode of operation and principles involved according to the present invention, rather than to limit the number of forms which the present invention may assume. It is therefore to be understood that various adaptations, alterations, and modifications may be applied to the specific form shown in accordance with the requirements of practice except as limited by the appending claims.

What we claim is:

1. A train speed control system having train carried equipment comprising in combination, an electro-pneumatic valve effective when in its deenergized position to cause application of the brakes of the train, an axle driven frequency generator, a slow acting relay effective when picked up to apply energy to said electro-pneumatic valve, a high-pass filter having the start of its pass band selectively variable between a first and higher frequency, circuit means including said high-pass filter for maintaining said slow acting relay steadily picked up when the frequency of said generator is below said first frequency of said high-pass filter, said circuit means being effective to pulse said slow acting relay when the frequency of said generator is above said first frequency but not greater than said higher frequency, and signalling means distinctively responsive to the intermittent pulsing of said slow acting relay.

2. A train speed control system having train carried equipment comprising in combination, an electro-pneumatic valve effective when in its deenergized position to cause application of the brakes of the train, an axle driven frequency generator, a slow acting relay effective when picked up to apply energy to said electro-pneumatic valve, an oscillator, a high-pass filter having the start of its pass band selectively variable between a first and a higher frequency, circuit means including said high-pass filter and said oscillator for maintaining said slow acting relay steadily picked up when the frequency of said generator is below said first frequency of said high-pass filter, said circuit means being effective to pulse said slow acting relay when the frequency of said generator is above said first frequency but not greater than said higher frequency, and said circuit means being effective to cause said slow acting relay to be steadily dropped when the frequency of said generator is greater than said higher frequency, and signalling means distinctively responsive to the intermittent pulsing of said slow acting relay.

3. A train speed control system having train carried equipment comprising in combination, an electro-pneumatic valve effective when in its deenergized position to cause application of the brakes of the train, an axle driven frequency generator, a high-pass filter having the start of its pass band selectively variable between a first and a higher frequency, electro-responsive means for governing said electro-pneumatic valve, said electro-responsive means being effective when actuated intermittently to maintain said electro-pneumatic valve in its energized position, circuit means including said high-pass filter for intermittently energizing said electro-responsive means only provided that the frequency of said generator is in a range between said first frequency and said higher frequency, and signalling means distinctively responsive to the intermittent pulsing of said electro-responsive means.

4. A train speed control system having train carried equipment comprising in combination, an electro-pneumatic valve effective when in its deenergized position to cause application of the brakes of the train, an axle driven frequency generator, a high-pass filter having the start of its pass band selectively variable between a first and a higher frequency, electro-responsive means having a detector relay subject to energization through said high-pass filter from said frequency generator, said electro-responsive means being effective upon maintaining said detector relay energized for a predetermined interval to select said higher frequency for said high-pass filter and thereby cause the dropping away of said detector relay, and said electro-responsive means being effective in accordance with the dropping away of said detector relay to select said first frequency for said high pass filter, circuit means for causing the actuation of said electro-pneumatic valve to apply the brakes of the train in accordance with a sustained energization of said detector relay for a substantial period of time, and signalling means operable in response to the intermittent pulsing of said detector relay when the output of said frequency generator is at a frequency between said first frequency and said higher frequency.

5. A train speed control system having train carried equipment comprising in combination, an axle driven frequency generator, a high-pass filter having the start of its pass band selectively variable between a first and a higher frequency, electro-responsive means having a detector relay subject to energization through said high-pass filter from said frequency generator, said electro-responsive means being effective upon maintaining said detector relay energized for a predetermined interval to select said higher frequency for said high-pass filter and thereby cause the dropping away of said detector relay, and said electro-responsive means being effective in accordance with the dropping away of said detector relay to select said first frequency for said high-pass filter and thereby cause the intermittent operation of said detector relay when the frequency of the output of said generator is between said first and said higher frequency, and signalling means operable in response to the intermittent pulsing of said detector relay.

6. A train speed control system having train carried equipment comprising in combination, an axle driven frequency generator, a detector relay, an oscillator, a high-pass filter having the start of its pass band selectively variable between a first and a higher frequency, electro-responsive means including said oscillator and said detector relay for energizing said detector relay through said high-pass filter by the output of said oscillator and by the output of said frequency generator, said electro-responsive means being effective upon maintaining said detector relay energized for a predetermined interval to select said higher frequency for said high-pass filter and thereby cause the dropping away of said detector relay if the output of the frequency generator is not above said higher frequency, and said electro-responsive means being effective in accordance with the dropping away of said detector relay to select said first frequency for said high-pass filter, and signalling means distinctively responsive to the pulsing of said detector relay in accordance with the frequency of the output of said generator being between said first and said higher frequency.

7. A train speed control system having train carried equipment comprising in combination, an axle driven frequency generator, a detector relay, a high-pass filter having the start of its pass band selectively variable between a first and a higher frequency, electro-responsive means for energizing said detector relay through said high-pass filter by the output of said frequency generator, said electro-responsive means being effective upon maintaining said detector relay energized for a predetermined interval to select said higher frequency for said high-pass filter and thereby cause the dropping away of said detector relay when the frequency of said generator is between said first and said higher frequencies, and said electro-responsive means being effective in accordance with the dropping away of said detector relay to select said first frequency for said high-pass filter, signalling means operable in response to the intermittent pulsing of said detector relay when the output of said frequency generator is at a frequency between said first frequency and said higher frequency, and circuit means for checking the integrity of said electro-responsive means when the frequency of the output of said generator is below the frequency of the start of the pass band of said high-pass filter.

8. A train speed control system having train carried equipment comprising in combination, an electro-pneumatic valve effective when in its deenergized position to cause application of the brakes of the train, an axle driven frequency generator, a detector relay, a high-pass filter having the start of its pass band selectively variable between a first and a higher frequency, electro-responsive means for energizing said detector relay through said high-pass filter from said frequency generator, said electro-responsive means being effective upon maintaining said detector relay energized for a predetermined time interval to select said higher frequency for said high-pass filter, and said electro-responsive means being effective in accordance with the dropping away of said detector relay to select said first frequency for said high-pass filter, signalling means operable in response to the intermittent pulsing of said detector relay when the output of said frequency generator is at a frequency between said first frequency and said higher frequency, circuit means for checking the integrity of said electro-responsive means when the frequency of the output of said generator is below the frequency of the start of the pass band of said high-pass filter, circuit means effective upon the sustained energization of said detector relay to cause actuation of said electro-pneumatic valve to its deenergized position, and penalty means effective when said electro-pneumatic valve has been actuated to its deenergized position to prevent the release of the brakes of the train until the speed of the train has been materially reduced.

References Cited in the file of this patent

UNITED STATES PATENTS

| Number | Name | Date |
| --- | --- | --- |
| 1,871,404 | Brown | Aug. 9, 1932 |
| 2,222,801 | Logan | Nov. 26, 1940 |
| 2,427,175 | Young | Sept. 9, 1947 |
| 2,478,000 | Miller | Aug. 2, 1949 |
| 2,558,445 | Laurenson | June 26, 1951 |
| 2,606,281 | Thomas et al. | Aug. 5, 1952 |